United States Patent [19]  [11] 4,033,167
Philibert  [45] July 5, 1977

[54] PROCESS FOR FORMING INTERMEDIATE METAL CONDUIT

[75] Inventor: Robert A. Philibert, Burlington, Conn.

[73] Assignee: General Signal Corporation, New York, N.Y.

[22] Filed: Mar. 5, 1976

[21] Appl. No.: 664,150

Related U.S. Application Data

[63] Continuation of Ser. No. 499,387, Aug. 21, 1974, abandoned.

[52] U.S. Cl. .................................. 72/367; 138/109; 138/177; 285/176; 285/390
[51] Int. Cl.² .................. B21D 51/00; F16L 15/00
[58] Field of Search ................. 138/177, 178, 109; 10/1 R, 1 B, 120.5; 249/59; 29/183.5, 240; 408/1; 285/18, 40, 334, 333, 425, 176, 177, 390; 72/367

[56] References Cited

UNITED STATES PATENTS

| 859,803 | 7/1907 | Cummings | 285/333 |
| 2,154,037 | 4/1939 | Eaton | 285/334 |
| 2,245,419 | 6/1941 | Unke | 285/390 |
| 3,540,757 | 11/1970 | Neher | 138/109 |
| 3,858,911 | 1/1975 | Martin | 285/173 |

Primary Examiner—Lowell A. Larson
Attorney, Agent, or Firm—John F. Ohlandt; Milton E. Kleinman

[57] ABSTRACT

A forming technique is disclosed for intermediate metal conduit so as to make it compatible with electrical fittings that are usually employed with conventional rigid conduit.

7 Claims, 4 Drawing Figures

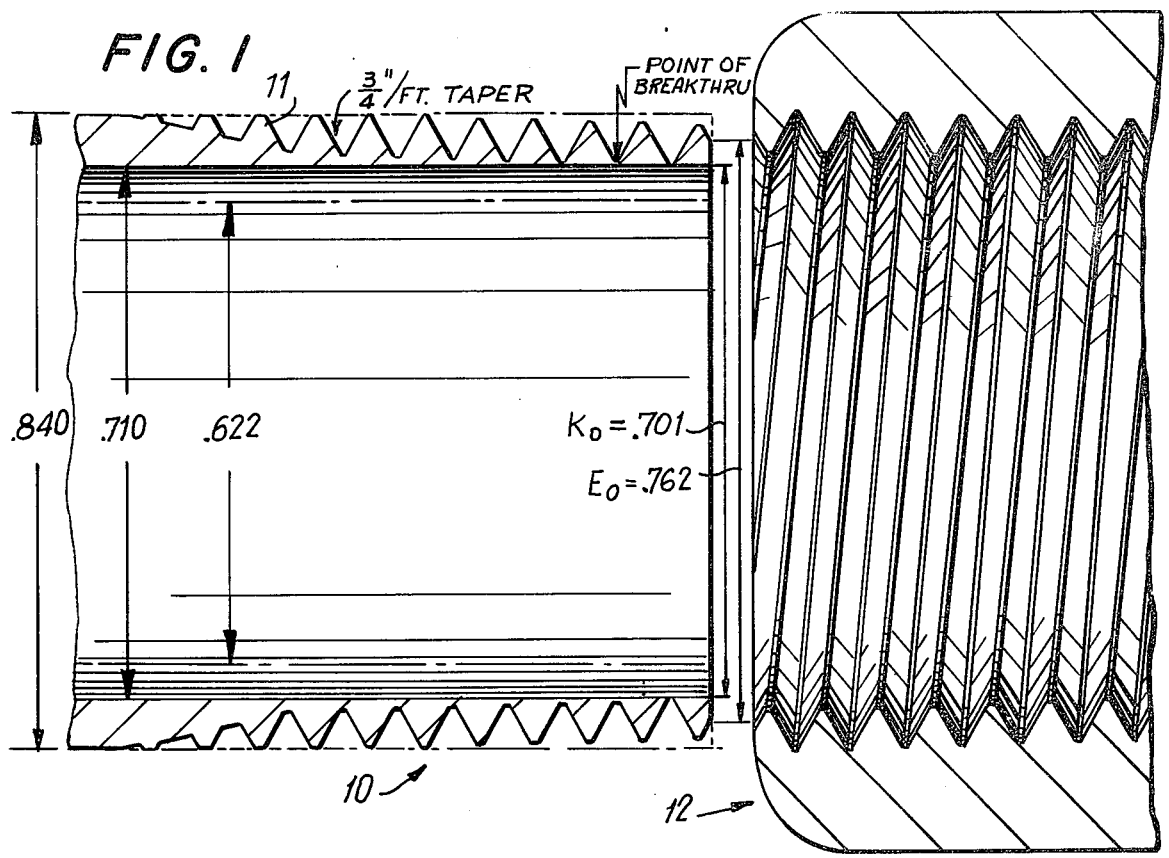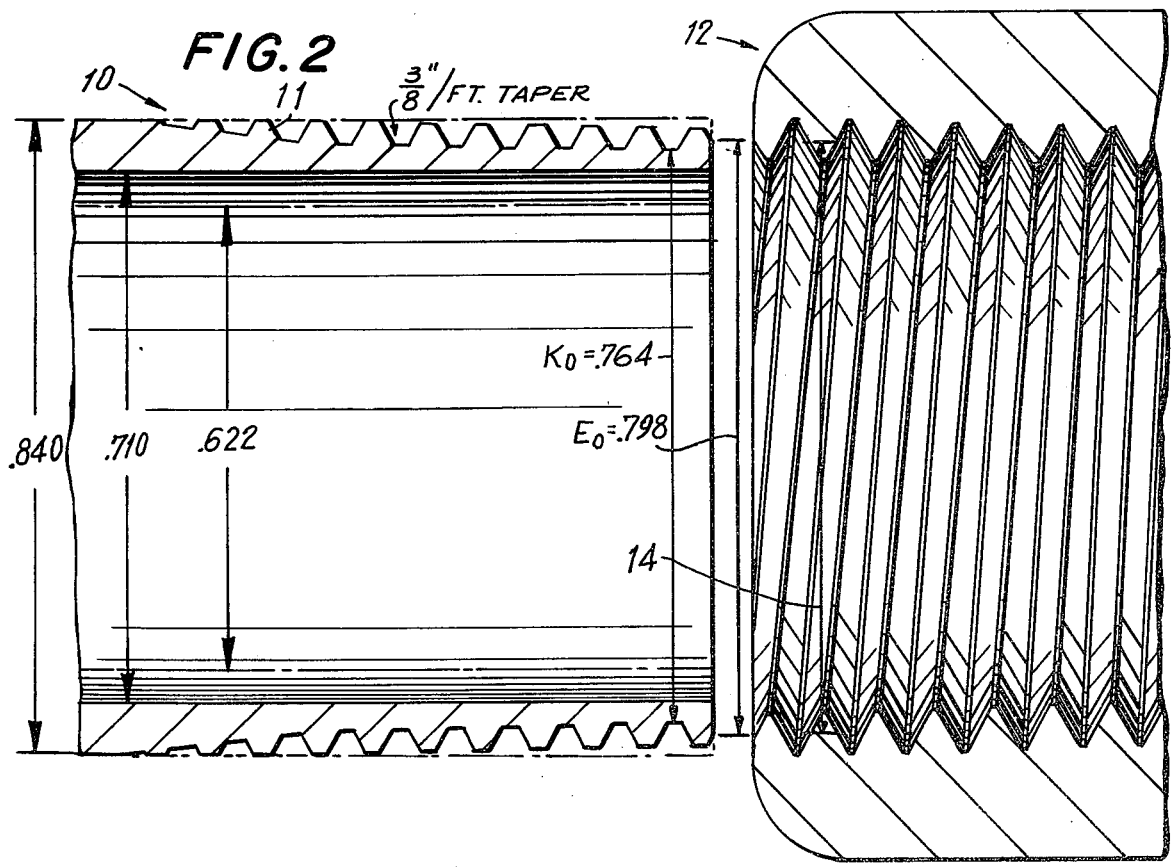

PROCESS FOR FORMING INTERMEDIATE METAL CONDUIT

This is a continuation, of application Ser. No. 499,387 filed Aug. 21, 1974, now abandoned.

BACKGROUND, OBJECTS AND SUMMARY OF THE INVENTION:

The present invention pertains to electrical equipment and, more particularly to a species of electrical conduit known as intermediate metal conduit, the invention permitting fittings that are presently designed for use with conventional rigid conduit to be employed interchangeably with such intermediate conduit.

Up to now, the National Electrical Code has allowed the use of heavy wall conduit, which is known in the trade as rigid conduit. Such conduit has a wall thickness equal to Schedule 40 Pipe. It should be noted that by Code definitions, such rigid conduit must be furnished with threads which have a taper of three-quarter inch per foot.

More recently, there has been proposed by industry sources, for inclusion in the 1975 National Electrical Code, a new type of conduit known as intermediate metal conduit (IMC).

A proposal for such conduit is especially timely in view of the recent experiences in this country with shortages of material, such shortages having severely affected the manufacture of rigid metal conduit. The newly proposed intermediate metal conduit uses approximately (60%) of the steel since it has a wall thickness of approximately (60%) of the rigid conduit wall thickness. Moreover, generally speaking, it is much more easily manufactured.

The present National Electrical Code proposal will allow intermediate grade conduit to be furnished threaded or unthreaded; however, if it is furnished threaded, it is required by such proposal to have a taper in its thread of three-eighth inch per foot. The reason behind the lower requirement on the taper is that in accordance with previous proposals for forming intermediate metal conduit, it could not have a taper of three-quarter inch per foot since the established wall thickness would be insufficient to allow for this latter angle of taper.

Accordingly, it will be appreciated that a source of great difficulty arises in that the threads of the proposed intermediate metal conduit would be designed with a thread system that is not interchangeable with the thread system of rigid conduit. As a result of the aforesaid incompatibility between the thread systems, the ordinary course would be to utilize adapters so as to interface with the conventional rigid conduit fitting and boxes; that is to say, the adapters would be provided with a specially modified female thread on one end and a standard male, rigid conduit, thread on the other end. Otherwise, entirely new lines of fittings would have to be designed for use with the intermediate metal conduit. The latter course would obviously impose a tremendous financial burden on the electrical industry, since the cost of tooling of such a new line of fittings and the additional inventories involved would be extremely costly.

It must be recognized, however, that if adapters are chosen as the expedient to be utilized, they may not always be used. Experience teaches that when other alternatives are available to the worker in the field, he will adopt such alternatives. For example, where the only tool available to him is a conventional threading die and he must thread the conduit at the site, he will use such conventional threading die, but only for a portion of a distance he would normally use it on rigid conduit. By threading only a portion of the normal distance involved, he would thereby avoid the problem of cutting through the conduit. However, such an arrangement is entirely unsatisfactory because, since one would have to shorten the distance as much as four to five thread lengths, the pitch diameter at the end of the conduit would not then permit entry of a hub or other fitting onto the conduit.

In addition to the foregoing, the threading problems as noted above produce a high degree of confusion inasmuch as the different threads, such as the ⅜ inch per foot taper proposed for IMC versus the ¾ inch per foot for rigid conduit, result in difficulties for workers in using lock nuts and threaded fittings which are not really compatible. In other words, unless the fittings and lock nuts are kept entirely separate, the difference in the taper, which is not readily apparent, would result in incorrect fittings being used. Consequently, a serious safety problem would arise inasmuch as this kind of conduit is often used as a grounding conductor.

Another factor that must be understood is that the present NEC proposal requires that intermediate metal conduit have the same nominal outside diameter as rigid conduit in order that certain fittings which enable threadless connection of rigid conduit be likewise adapted for threadles connection of intermediate metal conduit without modification.

Accordingly, it is a primary object of the present invention to overcome the aforesaid problems and difficulties with respect to achieving compatibility of thread design and to afford a solution thereto.

A more specific object is to ensure that the fittings designed for threaded rigid conduit can also be employed when intermediate metal conduit is used; in other words, that the basic fittings are interchangeable with either kind of conduit.

Another specific object is to provide compatibility of the thread system such that conventional threading die, typically used at a construction site, can be used without giving rise to safety problems.

A recent proposal which has been described in the literature and which has been directed to overcoming partially the aforenoted difficulties is a technique which is known as a swaging operation and involves forcing a tapered ring die over the end of the conduit. Thus, an initial taper is applied to the intermediate metal conduit prior to the formation of the tapered thread. The difficulty here is that performing the swaging operation in the field involves holding the conduit and delivering the required high degree of force without the use of power equipment.

Accordingly, it is another object of the present invention to avoid the difficulties entailed with a swaging operation at the construction site and to provide for conventional use of a standard threading die at such site.

The principal feature of the present invention resides in the recognition that intermediate metal conduit can be made compatible with the fittings normally used on rigid conduit by fabricating or forming the intermediate metal conduit so as to have an outside diameter that favors the lower side of the wide tolerance range applicable to the outside diameter of rigid conduit. For example, taking the trade or nominal one-half inch size for rigid conduit, such conduit is manufactured with a tolerance such that it will have an outside diameter which varies between 0.856 maximum and 0.809 minimum. Thus, if the intermediate metal conduit is formed so as to have a nominal outside diameter with a dimension of the order of 0.815 ± 0.005 inches or, in other words, 0.820 maximum to 0.810 minimum, it could then have an $E_0$ (pitch diameter at beginning of external thread) with a nominal dimension of 0.762. This arrangement permits interchangeability of a rigid conduit fitting such as a hub, since such a hub will be threadable onto an intermediate metal conduit having such a nominal pitch diameter.

It will be apparent as the description proceeds that although only a single example of a one-half inch size has been indicated above, the basic principle of the present invention can be applied as well to a variety of trade sizes, such as the sizes from ½ to 4 inches, or any other sizes. In other words, the same concept of favoring the minimum side of the rigid conduit tolerances can be followed in all such cases.

Thus, the present invention may be characterized briefly as a method of producing or fabricating intermediate metal conduit by (1) particularly dimensioning its nominal outside diameter such that it falls at the lower end of the wide tolerance range on the outside diameter for conventional rigid conduit; (2) appropriately dimensioning the wall thickness for the IMC.

It should be appreciated that such dimensioning does not affect conduit fill, since the inside diameter of the proposed IMC is still much larger than the inside diameter of the comparable rigid conduit.

Other and further objects, advantages and features of the present invention will be understood by reference to the following specification in conjunction with the annexed drawings, wherein like parts have been given like numbers.

BRIEF DESCRIPTION OF THE DRAWINGS:

FIG. 1 is a sectional view of an intermediate metal conduit (IMC) in accordance with a prior art proposal; also shown therewith is a standard fitting or hub for engagement with that conduit, the taper on the conduit thread being ¾inch per foot.

FIG. 2 is a sectional view of another intermediate metal conduit in accordance with another prior art proposal, being similar to FIG. 1 except that a three-eighth inch per foot taper is used on the conduit thread.

Figure 3:
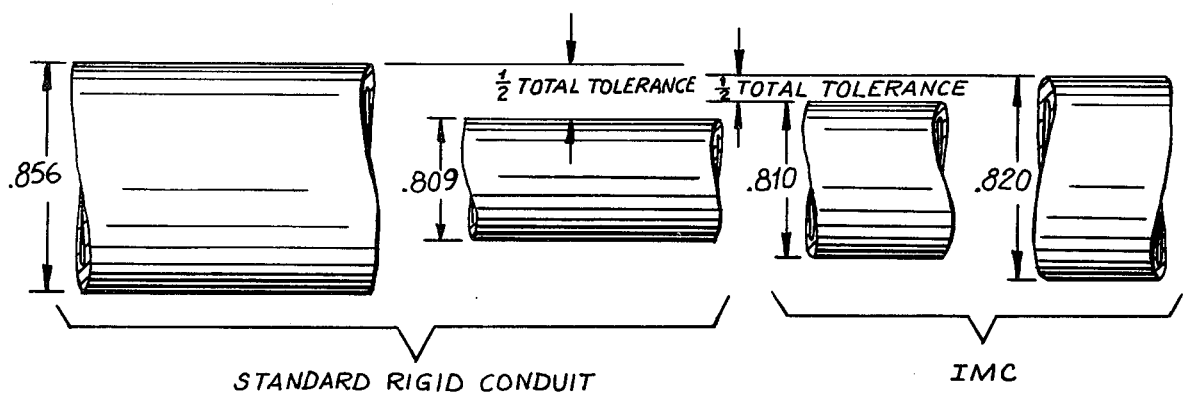
FIG. 3 is an illustration which serves to compare an example of a typical, standard size, rigid conduit with an intermediate conduit of like size formed in accordance with the present invention so as to have a nominal outside diameter comparable to the lower end of the tolerance on the outside diameter for the rigid conduit.

DESCRIPTION OF PREFERRED EMBODIMENT:

The description of a preferred embodiment will make reference to the four figures of the drawings and also to two tables included below for providing a complete understanding of the concept of the present invention.

TABLE I

BASIC DIMENSIONS OF USA (AMERICAN) STANDARD TAPER PIPE THREAD, NPT

| Nominal Pipe Size 1 | Outside Diameter of Pipe, D 2 | Threads per inch, n 3 | Pitch of Thread P 4 | Pitch Diameter at beginning of External Thread, $E_0$ 5 | Handtight Engagement | | | Effective Thread, External | | |
|---|---|---|---|---|---|---|---|---|---|---|
| | | | | | Length, $L_1$ | | Dia. $E_1$ 8 | Length, $L_2$ | | Dia. $E_2$ 11 |
| | | | | | In. 6 | Thds. 7 | | In. 9 | Thds. 10 | |
| ½ | 0.840 | 14 | 0.07143 | 0.75843 | 0.320 | 4.48 | 0.7784 | 0.5337 | 7.47 | 0.79179 |
| ¾ | 1.050 | 14 | 0.07143 | 0.96768 | 0.339 | 4.75 | 0.98887 | 0.5457 | 7.64 | 1.00179 |
| 1 | 1.315 | 11.5 | 0.08696 | 1.21363 | 0.400 | 4.60 | 1.23863 | 0.6828 | 7.85 | 1.25630 |
| 1¼ | 1.660 | 11.5 | 0.08696 | 1.55713 | 0.420 | 4.83 | 1.58338 | 0.7068z | 8.13 | 1.60130 |
| 1½ | 1.900 | 11.5 | 0.08696 | 1.79609 | 0.420 4.83 | 1.82234 | 0.7235 | 8.32 | 1.84130 | |
| 2 | 2.375 | 11.5 | 0.08696 | 2.26902 | 0.436 | 5.01 | 2.29627 | 0.7565 | 8.70 | 2.31630 |
| 2½ | 2.875 | 8 | 0.12500 | 2.71953 | 0.682 | 5.46 | 2.76216 | 1.1375 | 9.10 | 2.79062 |
| 3 | 3.500 | 8 | 0.12500 | 3.34062 | 0.766 | 6.13 | 3.38850 | 1.2000 | 9.60 | 3.41562 |
| 3½ | 4.000 | 8 | 0.12500 | 3.83750 | 0.821 | 6.57 | 3.88881 | 1.2500 | 10.00 | 3.91562 |
| 4 | 4.500 | 8 | 0.12500 | 4.33428 | 0.844 | 6.75 | 4.38712 | 1.3000 | 10.40 | 4.41562 |

| Wrench Makeup Length for External Thread, $L_2-L_1$ | | Wrench Makeup Length for Internal Thread | | | Vanish Thread, V | | Overall Length External Thread $L_4$ 19 | Nominal Complete External Threads | | Height of Thread h 22 | Increase in Dia. per Thread, 0.0623/n 23 | Basic Minor Dia at Small End of Pipe, $K_0$ 24 |
|---|---|---|---|---|---|---|---|---|---|---|---|---|
| In. 12 | Thds. 13 | Length, $L_3$ | | Dia. $E_3$ 16 | In 17 | Thds. 18 | | Length $L_5$ 20 | Dia $E_5$ 21 | | | |
| | | In. 14 | Thds. 15 | | | | | | | | | |
| 0.2137 | 2.99 | 0.2143 | 3 | 0.74504 | 0.2478 | 3.47 | 0.7815 | 0.3909 | 0.78286 | 0.05714 | 0.00446 | 0.7013 |
| 0.2067 | 2.89 | 0.2143 | 3 | 0.95429 | 0.2478 | 3.47 | 0.7935 | 0.4029 | 0.99286 | 0.05714 | 0.00446 | 0.9105 |
| 0.2828 | 3.25 | 0.2609 | 3 | 1.19733 | 0.3017 | 3.47 | 0.9845 | 0.5089 | 1.24543 | 0.06957 | 0.00543 | 1.1441 |
| 0.2868 | 3.30 | 0.2609 | 3 | 1.54083 | 0.3017 | 3.47 | 1.0085 | 0.5329 | 1.59043 | 0.06957 | 0.00543 | 1.4876 |
| 0.3035 | 3.49 | 0.2609 | 3 | 1.77900 | 0.3017 | 3.47 | 1.0252 | 0.5496 | 1.83043 | 0.06957 | 0.00543 | 1.7265 |
| 0.3205 | 3.69 | 0.2609 | 3 | 2.25272 | 0.3017 | 3.47 | 1.0682 | 0.5826 | 2.30543 | 0.06957 | 0.00543 | 2.1995 |
| .4555 | 3.64 | 0.2500 | 2 | 2.70391 | 0.4337 | 3.47 | 1.5712 | 0.8875 | 2.77500 | 0.100000 | 0.00781 | 2.6195 |
| 0.4340 | 3.47 | 0.2500 | 2 | 3.32500 | 0.4337 | 3.47 | 1.6337 | 0.9500 | 3.40000 | 0.100000 | 0.00781 | 3.2406 |
| 0.4290 | 3.43 | 0.2500 | 2 | 3.82188 | 0.4337 | 3.47 | 1.6837 | 1.0000 | 3.90000 | 0.100000 | 0.00781 | 3.7375 |
| 0.4560 | 3.65 | 0.2500 | 2 | 4.31875 | 0.4437 | 3.47 | 1.7337 | 1.0500 | 4.40000 | 0.100000 | 0.00781 | 4.2344 |

TABLE II

INTERMEDIATE METAL CONDUIT THREAD DIMENSIONS

| Trade Size (Inches) | Threads per inch n | Pitch of Thread p | Minor Diameter at Small End (Minimum) $K_0$ | Pitch Diameter at Beginning of External Thread | | | Overall Length of External Thread $L_1$ | Nominal Complete External Threads $L_s$ | | Pitch Diameter at $E_3$ |
|---|---|---|---|---|---|---|---|---|---|---|
| | | | | Nominal $E_0$ | Minimum | Maximum | | In. | Thds. | |
| ½ | 14 | .07143 | .712 | .7625 | .7580 | .7679 | .779 | .388 | 5.43 | .7868 |
| ¾ | 14 | .07143 | .922 | .9725 | .9680 | .9770 | .793 | .452 | 6.33 | 1.0080 |
| 1 | 11½ | .08696 | 1.165 | 1.2264 | 1.2210 | 1.2318 | .984 | .434 | 4.99 | 1.2535 |
| 1¼ | 11½ | .08696 | 3.236 | 1.5664 | 1.5610 | 1.5718 | 1.008 | .562 | 6.46 | 1.6015 |
| 1½ | 11½ | .08696 | 1.740 | 1.8014 | 1.7960 | 1.8068 | 1.025 | .722 | 8.30 | 1.8465 |
| 2 | 11½ | .08696 | 2.217 | 2.2784 | 2.2730 | 2.2838 | 1.058 | .722 | 8.30 | 2.3235 |
| 2½ | 8 | .12500 | 2.657 | 2.7458 | 2.7308 | 2.7536 | 1.571 | .956 | 7.65 | 2.8056 |
| 3 | 8 | .12500 | 3.276 | 3.3648 | 3.3570 | 3.3726 | 1.633 | .956 | 7.65 | 3.4246 |
| 3½ | 8 | .12500 | 3.771 | 3.8598 | 3.8520 | 3.8676 | 1.683 | .956 | 7.65 | 3.9196 |
| 4 | 8 | .12500 | 4.266 | 4.3548 | 4.3470 | 4.3626 | 1.733 | .956 | 7.65 | 4.4146 |

DIMENSIONS OF CONDUIT

| Trade Size (Inches) | Outside Diameter | | | Inside Diameter | | | Wall Thickness |
|---|---|---|---|---|---|---|---|
| | Nominal | Minimum* | Maximum | Nominal | Minimum | Maximum* | |
| ½ | .815 | .810 | .820 | .685 | .680 | .690 | .065 |
| ¾ | 1.029 | 1.024 | 1.034 | .887 | .882 | .892 | .071 |
| 1 | 1.290 | 1.285 | 1.295 | 1.130 | 1.125 | 1.135 | .080 |
| 1¼ | 1.638 | 1.630 | 1.645 | 1.468 | 1.460 | 1.475 | .085 |
| 1½ | 1.883 | 1.875 | 1.890 | 1.703 | 1.695 | 1.710 | .090 |
| 2 | 2.360 | 2.352 | 2.367 | 2.170 | 2.162 | 2.177 | .095 |
| 2½ | 2.857 | 2.847 | 2.867 | 2.607 | 2.597 | 2.617 | .125 |
| 3 | 3.476 | 3.466 | 3.486 | 3.226 | 3.216 | 3.236Z | .125 |
| 3½ | 3.971 | 3.961 | 3.981 | 3.721 | 3.711 | 3.731 | .125 |
| 4 | 4.466 | 4.456 | 4.476 | 4.216 | 4.206 | 4.226 | .125 |

*No-go gage dimension

Before proceeding with the description, it would be well to consider that the tight tolerances that are proposed in accordance with the present invention can be maintained for intermediate metal conduit precisely because such conduit is made on rolling mills which can be very carefully controlled in the diemensioning of the product produced. On the other hand, rigid conduit, being made on C. W. (i.e., hot roll) mills, because of process limitations, has a much greater thickness than is required for IMC and can't be held to the close tolerances that can be imposed on IMC. For example, for one-half inch nominal pipe size, such rigid conduit has an outside diameter which is nominally 0.840, but which can vary between a miximum of 0.856 and a minimum of 0.809 inches.

With respect to the Table I herein provided immediately above, all of the usual parameters that are associated with basic or standard taper pipe thread - which is the same thread applied to rigid electrical conduit - are found in this table. Table II, on the other hand, has been restricted to the particularly important parameters concerned with the present invention.

Referring now particularly to FIGS. 1 and 2, there will be seen several sectional views of intermediate metal conduit in accordance with prior art proposals. Shown on the left in each of these figures is a length 10 of such intermediate metal conduit, the only difference between the two lengths illustrated being the fact that the length 10 in FIG. 1 has a three-quarter inch per foot taper applied to its thread 11, whereas in FIG. 2 a three-eighth inch per foot taper has been applied. In each of these figures a standard or conventional hub 12, having a thread with a ¾ inch/foot taper, is shown in position to be threadedly engaged on the conduit length 10.

It will be especially noted that the proposal exemplified in FIG. 1, that is, the proposal for using or applying the same basic dimensioning to intermediate metal conduit as has been applied to standard rigid conduit, results in breakthrough of the conduit when a ¾ per inch taper is applied to the length 10 of the intermediate metal conduit. This is because $K_0$ (see column 24 of Table I) has a value of 0.701 inches. With a nominal outside diameter of 0.840 as seen in FIG. 1, the corresponding nominal inside diameter is 0.710. Hence, the occurrence of breakthrough since the $K_0$ dimension is considerably smaller than 0.710. It should also be noted that the nominal inside diameter of 0.622 is the diameter of the comparable size of rigid conduit and accordingly is depicted in phantom lines in the figures.

Turning now to FIG. 2, another problem which is presented by another prior art proposal is depicted. In this figure the same type of intermediate metal conduit is involved and the same nominal outside diameter and inside diameter are indicated as in FIG. 1. However, in FIG. 2 a ⅜ inch per foot taper is shown and the result of this is that $E_0$ which is the pitch diameter at the end of conduit length 10 at which the hub 12 is to be threadedly engaged, has a value which is approximately 0.798 inches, being considerably larger than the pitch diameter on the standard hub 12 as indicated by numeral 14. Such pitch diameter of the hub can run from 0.778 to 0.796 inches depending on the threading practice. Hence, with the use of the three-eighth inch per foot taper on the external thread of the conduit 10, the thread on the conduit will not start into the internal thread on the hub since the pitch diameter of the hub is smaller than the aforesaid pitch diameter of the conduit.

FIG. 3 gives some notion of the tolerances involved in the manufacture of both standard rigid conduit and IMC. This figure also illustrates the underlying concept of the present invention which capitalizes on the ability of the IMC to be made to very tight tolerances, thereby to enable fabrication of the IMC at the lower end of the wide tolerance permitted for the standard rigid conduit. For example, considering the one-half inch size, which was also under consideration in connection with FIGS. 1 and 2, the nominal outside diameter for the rigid conduit is 0.840, which in the prior art illustrations of FIGS. 1 and 2 was also applied to the IMC. Thus, the outer diameter range for the standard rigid conduit, seen on the left in FIG. 3, for a nominal 0.840 is between 0.856 maximum and 0.809 minimum, all such dimensions being understood to be in inches.

Even though, in accordance with the present invention, the IMC is dimensioned at the lower end of the tolerance range for the rigid conduit, it is still possible to maintain compatibility between the two types of conduit; for example, the same fittings that are used for making a threadless connection between two pieces of standard rigid conduit could also be untilized in makeing a threadless connection between the IMC. The advantages which flow from the principle of the present invention will be appreciated by reference to FIG. 4 in which a standard hub 12, the same as previously illustrated in FIGS. 1 and 2, is shown in relationship with a length of the intermediate metal conduit fabricated in accordance with the principle of the present invention. A typical length 16 of the IMC is shown on the left. It will be noted that the nominal outer diameter in accordance with the present invention is 0.815, the same as for the IMC illustrated in FIG. 3 in which a minimum dimension of 0.810 and a maximum of 0.820 were indicated, the nominal figure being between the maximum and minimum. From this it will be appreciated that the tolerance to which the IMC can be held is approximately 0.010, at least insofar as the smaller sizes of conduit are concerned, that is, sizes from between ½ inch and one and ½ inches approximately.

Having selected the outer diameter of the IMC such that it falls at approximately the lower end of the rigid conduit tolerance, thus providing for the one-half inch size under consideration a nominal outside diameter of 0.815, there results a nominal inside diameter of 0.685, since the thickness of such intermediate metal conduit is as before indicated in FIGS. 1 and 2, that is, such conduit has a wall thickness of approximately 0.065 (½ the difference between the outer diameter and inner diameter).

Figure 4:
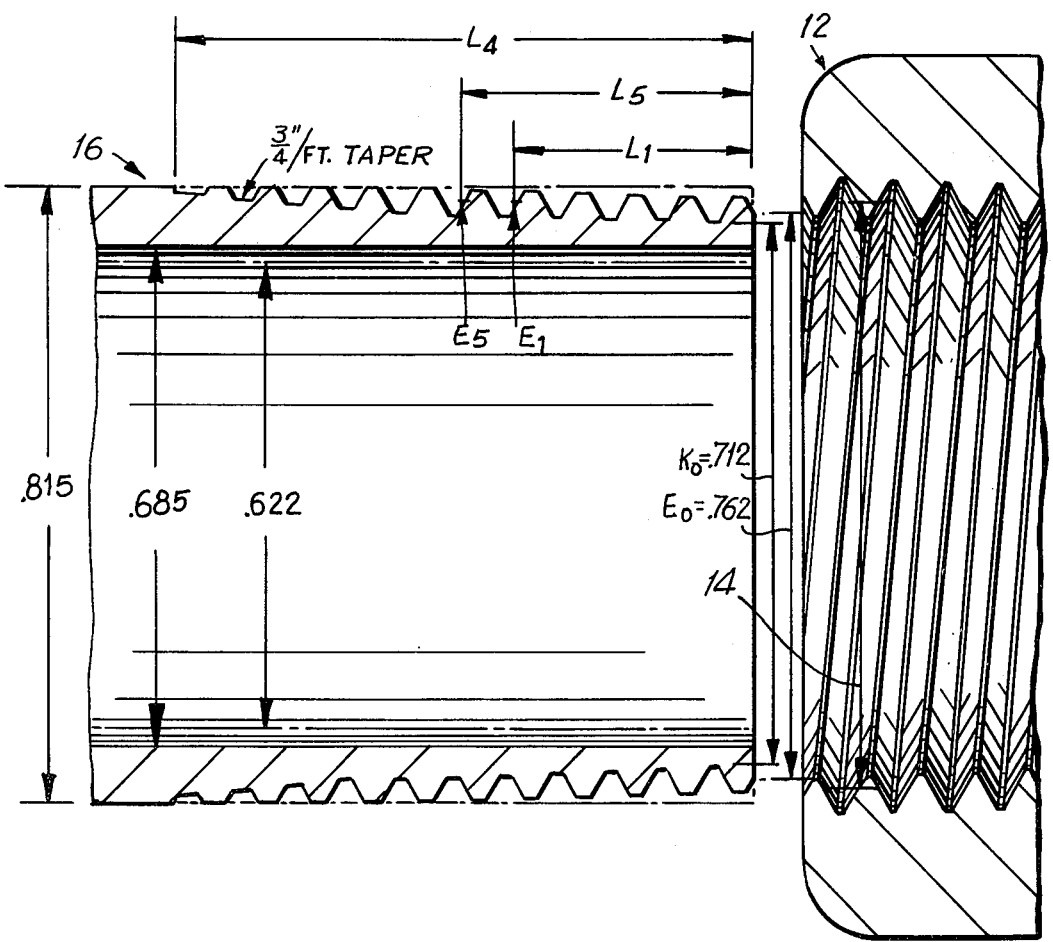
FIG. 4 is another sectional view, this time of an intermediate metal conduit in accordance with the present invention shown in relationship to a standard hub as previously depicted in FIGS. 1 and 2 and illustrating that the hub will engage properly with the conduit, unlike the situation depicted in FIG. 2, and furthermore that the conduit will not be broken through as was the situation depicted in FIG. 1.

The other parameters indicated on FIG. 4 are simply provided to enable one skilled in the art to appreciate all of the dimensions involved but they are not necessary to understanding the broad principle of the present invention. With reference to the table, that is, the TABLE II will give the values for the various parameters $L_1$, $L_4$, $L_5$, $E_1$, $E_5$, etc.

Also, in FIG. 4, the IMC is shown as having a three-quarter inch per foot taper applied to it with the consequence that unlike the situation depicted for the proposal of FIG. 1, there is no breaking through of the conduit wall. Thus, even though the degree of tapering is the same in both instances, that is, in both FIGS. 1 and 4, it is precisely because the present invention recognizes the significance and advantage of reducing the outer diameter and, pari passu, the inner diameter of the IMC that the problem depicted in FIG. 1 is avoided. Moreover, the problem as it occurs in FIG. 2, that is, the problem of the inability to begin the threadable engagement of the conduit and hub is likewise overcome inasmuch as it will be seen in FIG. 4 that $E_0$ in this instance is considerably smaller than the pitch diameter at the end of the hub 12, the latter being approximately 0.778 to 0.796 inches.

Although in the embodiment of the invention seen in FIG. 4, the taper of the thread applied to the conduit length 16 was three-quarter inch per foot, the invention is not necessarily limited to this precise taper and a different taper such as, for example, ⅝ inch per foot, or no taper, could likewise be applied to the suitably dimensioned conduit length 16. In other words, with a ⅝ inch per foot taper one would still have a suitably small $E_0$ having a value of approximately 0.768 which is smaller than the pitch diameter at the entrance of the hub 12 and thus threadable engagement between hub and the conduit length 16 could be effectuated.

It will have become apparent that the particular technique that is adopted for fabricating the intermediate metal conduit is not critical in accordance with the principle of the present invention. As mentioned previously, the crucial factor is the maintenance of tight tolerances of the order of 0.010 inches on the smaller sizes of the IMC, tolerances of 0.020 to 0.030 inches being applied to the larger sizes. Such tolerances can be realized by fabricating the IMC by means of a cold rolling mill technique. However, other techniques which can yield this limitation on tolerance can also be utilized.

It will be understood by those skilled in the art that the great benefits which flow from the principle of the present invention are that complete compatibility is achieved for the convention standard hubs and other fittings that have traditionally been in use within the industry; further, that the intermediate metal conduit as formed in accordance with the present invention can have the required threads applied at a construction site by a mechanic using what is already a standard piece of equipment, namely, a threading die useful for producing a three-quarter inch per foot taper on conventional rigid conduit. Thus, no problems arise because of lack of equipment especially designed for applying a particular thread to IMC; instead, a conventional die can be used for such purpose. As a result, no dangerous condition can arise as would occur if a variety of threading dies had to be carefully selected for use with particular kinds and forms of conduit.

Although the aforenoted close control of the tolerances involved for the IMC would be necessary under the precise dimensioning discussed in connection with FIG. 4, such tight tolerances could be relaxed in the event that it was found advisable or desirable to have slightly more wall thickness.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A method of producing intermediate metal conduit, in accordance with National Electrical Code standards and in conventional trade sizes, such that fittings designed for a particular size of rigid metal conduit can be used interchangeably with a corresponding size of such intermediate metal conduit, comprising the steps of:
   a. forming the intermediate metal conduit with a wall thickness which is approximately sixty per cent of the wall thickness for the corresponding size of rigid metal conduit;

b. forming the intermediate metal conduit with a nominal outside diameter which corresponds with the lower end in the wide tolerance range for the outside diameter of the corresponding size of rigid metal conduit;

c. maintaining, during the aforesaid forming steps, a narrow total tolerance of the order of 0.010 inches for the smaller sizes, and increasing to the order of 0.020 inches for the larger sizes, on the nominal outside diameter such that the minimum value for the outside diameter of the intermediate metal conduit corresponds substantially with the minimum value in the wide tolerance range for the outside diameter of the corresponding size of rigid metal conduit;

whereby, when an external thread of predetermined taper is provided on said intermediate metal conduit as formed, the normally resulting breakthrough of such conduit due to the thread is prevented, and threaded fittings designed for the corresponding size of rigid conduit are then compatible with and engage said external thread on said intermediate metal conduit.

2. A method as defined in claim 1, further comprising the step of forming an external thread on said intermediate metal conduit.

3. A method as defined in claim 2, in which the step of forming the external thread is performed such that the same taper is applied on the intermediate metal conduit as exists for the external thread on the rigid conduit.

4. A method as defined in claim 2, in which the step of forming the external thread is performed by the same sized threading die as is conventionally used on said rigid conduit.

5. A method as defined in claim 2, in which said external thread on said intermediate metal conduit is formed to have a taper of three-quarter of an inch per foot.

6. A method as defined in claim 2, in which said external thread on said intermediate metal conduit is formed to have a taper of ⅜ of an inch per foot.

7. A method of producing intermediate metal conduit, in accordance with National Electrical Code standards and in conventional trade sizes, such that fittings designed for a particular size of rigid metal conduit can be used interchangeably with a corresponding size of such intermediate metal conduit, comprising the steps of:

a. forming the intermediate metal conduit with a wall thickness which is approximately 60 percent of the wall thickness for the corresponding size of rigid metal conduit;

b. forming the intermediate metal conduit with a nominal outside diameter which for the following trade sizes of ½ inch, ¾ inch, one inch, one and a quarter inches, one and ½ inches, 2 inches, 2½ inches, 3 inches, 3½ inches, and 4 inches, is respectively, in inches: 0.815; 1.029; 1.290; 1.638; 1.1883; 2.360; 2.857; 3.476; 3.971; and 4.466;

c. maintaining a narrow total tolerance on the outside diameter in forming said intermediate conduit such that substantially the following respective minimum values therefor are obtained, in inches: 0.810; 1.024; 1.285; 1.630; 1.875; 2.352; 2.847; 3.466; 3.961; and 4.456, said minimum values corresponding substantially with the minimum values in the wide tolerance range for the outside diameter of the corresponding respective sizes of rigid metal conduit;

whereby, when an external thread of predetermined taper is provided on said intermediate metal conduit as formed, the normally resulting breakthrough of such conduit due to the thread is prevented, and threaded fittings designed for the corresponding size of rigid conduit are then compatible with the engage said external thread on said intermediate metal conduit.

* * * * *

UNITED STATES PATENT OFFICE
CERTIFICATE OF CORRECTION

PATENT NO. : 4,033,167
DATED : July 5, 1977
INVENTOR(S) : Robert A. Philibert

It is certified that error appears in the above-identified patent and that said Letters Patent are hereby corrected as shown below:

Column 1, lines 32 and 33, after "approximately" insert --sixty per cent-- in each instance Table I, spanning columns 3 and 4, the numeral "4.83" now appearing in column 6, row 6, should be in column 7, row 5, and the numerals now appearing in columns 7, 8, 9 and 10 of row 5, respectively, should be shifted one column to the right; the numeral "0.7784" in column 8, row 1, should read --0.77843--; the numeral "0.7068z" in column 9, row 4, should read --0.7068--; in the heading of column 23, the numeral "0.0623/n" should read --0.0625/n--; the numeral ".4555" in column 12, row 7, should read --0.4555--; the numeral "1.0682" in column 19, row 6, should read --1.0582--

Table II, spanning columns 5 and 6, the numeral "3.236" in column 4, row 4, should read --1.505--; the numeral "388" in column 9, row 1, should read --.388--; the numeral "3.236Z" in column 18, row 8, should read --3.236--

Column 5, line 34, "diemensioning" should read --dimensioning--

Column 10, line 38, "the" should read --and--

Signed and Sealed this

Eighteenth Day of October 1977

[SEAL]

Attest:

RUTH C. MASON
Attesting Officer

LUTRELLE F. PARKER
Acting Commissioner of Patents and Trademarks